United States Patent
Tsuji et al.

(10) Patent No.: US 9,981,223 B2
(45) Date of Patent: May 29, 2018

(54) EXHAUST GAS PURIFICATION APPARATUS

(71) Applicant: CATALER CORPORATION, Kakegawa-shi, Shizuoka (JP)

(72) Inventors: Makoto Tsuji, Kakegawa (JP); Hiroto Imai, Kakegawa (JP); Shintaro Kobayashi, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 74 days.

(21) Appl. No.: 15/101,980

(22) PCT Filed: Dec. 5, 2014

(86) PCT No.: PCT/JP2014/082320
§ 371 (c)(1),
(2) Date: Jun. 6, 2016

(87) PCT Pub. No.: WO2015/087817
PCT Pub. Date: Jun. 18, 2015

(65) Prior Publication Data
US 2016/0310897 A1    Oct. 27, 2016

(30) Foreign Application Priority Data
Dec. 9, 2013   (JP) .................................. 2013-254478

(51) Int. Cl.
*F01N 3/10*    (2006.01)
*B01D 53/94*   (2006.01)
(Continued)

(52) U.S. Cl.
CPC ..... *B01D 53/9418* (2013.01); *B01D 53/9477* (2013.01); *B01J 23/42* (2013.01);
(Continued)

(58) Field of Classification Search
CPC ............... F01N 3/2066; F01N 13/0093; B01D 53/9477; B01D 2251/2067; B01J 45/04; B01J 29/85
(Continued)

(56) References Cited

U.S. PATENT DOCUMENTS

2009/0087365 A1    4/2009  Klingmann et al.
2011/0023463 A1*   2/2011  Dobson ................... F01N 3/035
                                                                60/286
(Continued)

FOREIGN PATENT DOCUMENTS

EP         2298432 A1     3/2011
JP      2000192810 A      7/2000
(Continued)

OTHER PUBLICATIONS

Jun. 14, 2016 International Preliminary Patentability on Patentability issued in International Patent Application No. PCT/JP2014/082320.
(Continued)

*Primary Examiner* — Tom P Duong
(74) *Attorney, Agent, or Firm* — Oliff PLC

(57) ABSTRACT

The exhaust gas purification apparatus is provided with: an upstream catalyst section which is disposed on the upstream side of an exhaust pipe; a downstream catalyst section which is disposed on the downstream side of the exhaust pipe with respect to the upstream catalyst section; and reducing agent solution supplier that supplies a reducing agent solution for generating ammonia from the upstream of the upstream catalyst section. The upstream catalyst section and the downstream catalyst section each include a SCR catalyst constituted by a zeolite, which adsorbs ammonia and reduces $NO_x$ in the exhaust gas. The skeleton density (A) of the SCR catalyst included in the upstream catalyst section is
(Continued)

less than the skeleton density (B) of the SCR catalyst included in the downstream catalyst section (A<B).

7 Claims, 6 Drawing Sheets

(51) Int. Cl.
| | |
|---|---|
| B01J 29/85 | (2006.01) |
| F01N 3/20 | (2006.01) |
| F01N 13/00 | (2010.01) |
| B01J 37/02 | (2006.01) |
| B01J 35/00 | (2006.01) |
| B01J 29/76 | (2006.01) |
| B01J 35/04 | (2006.01) |
| B01J 23/42 | (2006.01) |

(52) U.S. Cl.
CPC ........... *B01J 29/7615* (2013.01); *B01J 29/85* (2013.01); *B01J 35/0006* (2013.01); *B01J 35/04* (2013.01); *B01J 37/0215* (2013.01); *B01J 37/0244* (2013.01); *B01J 37/0246* (2013.01); *F01N 3/2066* (2013.01); *F01N 13/0093* (2014.06); *B01D 2251/2067* (2013.01); *B01D 2255/1021* (2013.01); *B01D 2255/2092* (2013.01); *B01D 2255/20738* (2013.01); *B01D 2255/20761* (2013.01); *B01D 2255/50* (2013.01); *B01D 2255/502* (2013.01); *B01D 2255/9032* (2013.01); *B01D 2255/9155* (2013.01); *B01D 2258/012* (2013.01); *B01J 2229/186* (2013.01); *Y02T 10/24* (2013.01)

(58) Field of Classification Search
USPC ............................ 422/171, 177, 180; 60/274
See application file for complete search history.

(56) References Cited

U.S. PATENT DOCUMENTS

| | | | |
|---|---|---|---|
| 2011/0047994 A1* | 3/2011 | Kato | ................. F01N 3/035 60/301 |
| 2011/0064632 A1* | 3/2011 | Huang | ............... B01D 53/9477 423/212 |
| 2012/0186229 A1 | 7/2012 | Phillips et al. | |
| 2013/0136677 A1 | 5/2013 | Chandler et al. | |

FOREIGN PATENT DOCUMENTS

| | | | |
|---|---|---|---|
| JP | 2002188429 | A | 7/2002 |
| JP | 2004060494 | A | 2/2004 |
| JP | 2005007260 | A | 1/2005 |
| JP | 2007-185571 | A | 7/2007 |
| JP | 2009082915 | A | 4/2009 |
| JP | 2011041905 | A | 3/2011 |
| JP | 2013019390 | A | 1/2013 |
| JP | 2014511270 | A | 5/2014 |
| JP | 2014525833 | A | 10/2014 |
| WO | 2012117041 | A1 | 9/2012 |
| WO | 2013014467 | A1 | 1/2013 |
| WO | 2013017873 | A1 | 2/2013 |

OTHER PUBLICATIONS

Jan. 20, 2015 International Search Report issued in International Patent Application No. PCT/JP2014/082320.

* cited by examiner

EXHAUST GAS PURIFICATION APPARATUS

TECHNICAL FIELD

The present invention relates to an exhaust gas purification apparatus, and more specifically to an exhaust gas purification apparatus for purifying exhaust gas discharged from an internal combustion engine such as a diesel engine.

The present application claims priority to Japanese Patent Application No. 2013-254478 filed on Dec. 9, 2013, the entire contents of which are incorporated herein by reference.

BACKGROUND ART

In general, exhaust gas discharged from an internal combustion engine includes particulate matter (PM) having carbon as the main component and ash including an incombustible component and is known to cause air pollution. In this regard, regulations relating to the emissions of particulate matter and also hazardous components such as hydrocarbons (HC), carbon monoxide (CO), and nitrogen oxide (NOx) contained in exhaust gas have been steadily enhanced year by year. Accordingly, techniques have been suggested for collecting and removing the particulate matter from the exhaust gas.

For example, a particulate filter is provided inside the exhaust passage of an internal combustion engine for collecting the particulate matter. For example, in diesel engines, a certain amount of particulate matter is discharged together with the exhaust gas, and to cope with this, a diesel particulate filter (DPF) is mounted inside the exhaust passage. Such a particulate filter is known to have the so-called wall-flow type structure in which a porous base material is configured to have a large number of cells and inlets and outlets of the large number of cells are alternately closed (Patent Literature 1 and 2). In the wall-flow type particulate filter, the exhaust gas that flows in from the cell inlet passes through the partitioned porous cell walls and is discharged to the cell outlet. While the exhaust gas are passing through the porous cell walls, the particulate matter is trapped in the fine pores inside the walls.

In recent years, the idea of imparting NOx purification capacity to the filter has been investigated to further improve the purification performance. For example, it has been suggested to provide the filter with a SCR (Selective Catalytic Reduction) catalyst for selectively reducing the NOx in the exhaust gas by the reduction action of ammonia or the like (Patent Literature 3). For example, in an exhaust gas purification apparatus of a urea addition type, urea water is supplied upstream of the filter supporting the SCR catalyst, and ammonia is generated by the hydrolysis of the urea water. This ammonia is adsorbed on the SCR catalyst, and the NOx in the exhaust gas is purified by the reduction action of the adsorbed ammonia. Zeolite such as copper-supporting zeolites and iron-supporting zeolites have been used as the SCR catalysts.

CITATION LIST

Patent Literature

Patent Literature 1: Japanese Patent Application Publication No. 2007-185571
Patent Literature 2: Japanese Patent Application Publication No. 2009-82915
Patent Literature 3: Japanese Patent Application Publication No. 2004-60494

SUMMARY OF INVENTION

The inventors have investigated an exhaust gas purification apparatus equipped with the SCR catalyst constituted by the zeolite, the apparatus using a combination of a filter catalyst supporting the SCR catalyst and a honeycomb catalyst supporting the SCR catalyst and a noble metal. In this case, the NOx can be purified while removing the PM contained in the exhaust gas by disposing the filter catalyst supporting the SCR catalyst on the upstream side of the exhaust pipe. Further, remnant ammonia which has not been consumed in the NOx purification is removed and the release (slip) of ammonia to the outside is suppressed by disposing the honeycomb catalyst supporting the SCR catalyst and noble metal on the downstream side of the exhaust pipe. However, it was found that when a SCR catalyst constituted by a zeolite is used in both the upstream filter catalyst and the downstream honeycomb catalyst, and where the zeolites of the same type are used in the two catalyst sections, the NOx purification ratio decreases and the desired NOx purification performance cannot be obtained. The present invention resolves this problem.

The exhaust gas purification apparatus provided by the present invention is disposed in the exhaust passage of an internal combustion engine to purify the exhaust gas discharged from the internal combustion engine. The exhaust gas purification apparatus is provided with: an upstream catalyst section which is disposed on the upstream side of an exhaust passage; a downstream catalyst section which is disposed on the downstream side of the exhaust passage with respect to the upstream catalyst section; and reducing agent solution supplier that supplies a reducing agent solution for generating ammonia from the upstream of the upstream catalyst section. The upstream catalyst section and the downstream catalyst section each include a SCR catalyst constituted by a zeolite which adsorbs ammonia and reduces $NO_x$ in the exhaust gas. The skeleton density (A) of the SCR catalyst included in the upstream catalyst section is less than the skeleton density (B) of the SCR catalyst included in the downstream catalyst section (A<B). It is thus possible to realize an optimum exhaust gas purification apparatus in which the NOx purification rate is increased and NOx purification performance is improved over those in the related art.

In a preferable embodiment of the exhaust gas purification apparatus disclosed herein, the difference between the skeleton density (A) of the SCR catalyst constituted by the zeolite included in the upstream catalyst section and the skeleton density (B) of the SCR catalyst constituted by the zeolite included in the downstream catalyst section is 0.1 (T/1000 Å$^3$)≤B−A, preferably 0.2(T/1000 Å$^3$)≤B−A. In this range of the difference (B−A) in the skeleton density, the catalytic performance improvement effect resulting from providing the difference in skeleton density of zeolites between the upstream catalyst section and the downstream catalyst section can be demonstrated at a higher level.

In a preferable embodiment of the exhaust gas purification apparatus disclosed herein, the skeleton density (A) of the SCR catalyst constituted by the zeolite included in the upstream catalyst section and the skeleton density (B) of the SCR catalyst constituted by the zeolite included in the downstream catalyst section are each 14(T/1000 Å$^3$) (inclusive) to 17(T/1000 Å$^3$) (inclusive). Within this range of the skeleton densities, a SCR catalyst with high heat resistance and high reactivity can be obtained. Therefore, all of the catalysts can demonstrate high NOx purification performance and good purification performance can be maintained.

In a preferable embodiment of the exhaust gas purification apparatus disclosed herein, the average fine pore size of the SCR catalyst constituted by the zeolite included in the upstream catalyst section and the average fine pore size of the SCR catalyst constituted by the zeolite included in the downstream catalyst section are each 2 Å (inclusive) to 7 Å (inclusive). Within this range of the average fine pore size, a SCR catalyst with high heat resistance and high reactivity can be obtained. Therefore, all of the catalysts can demonstrate high NOx purification performance and good purification performance can be maintained.

In a preferable embodiment of the exhaust gas purification apparatus disclosed herein, a filter catalyst section disposed on the upstream side of the exhaust passage and a plurality of honeycomb catalyst sections disposed on the downstream side of the exhaust passage with respect to the filter catalyst section are provided. The upstream catalyst section is provided as the filter catalyst section, and the downstream catalyst section is provided as the honeycomb catalyst section disposed on the downstreammost side of the exhaust passage, among the plurality of honeycomb catalyst sections. With such a configuration, the NOx can be purified, while removing the PM contained in the exhaust gas, in the filter catalyst section.

In a preferable embodiment of the exhaust gas purification apparatus disclosed herein, a noble metal (for example, platinum) is supported in the honeycomb support section disposed on the downstreammost side. With such a configuration, since the downstream catalyst section supporting the noble metal functions as a catalyst, remnant ammonia which has not been consumed in NOx purification can be removed. Therefore, the discharge (slip) of the ammonia to the outside can be suppressed.

DESCRIPTION OF EMBODIMENTS

The preferred embodiments of the present invention are described below with reference to drawings. Matters necessary to practice this invention (for example, general matter relating to the arrangement of particular filter in an automobile) other than those specifically referred to in this description may be understood as design matters based on the related art in the pertinent field for a person skilled in the art. The present invention can be practiced based on the contents disclosed in this description and common technical knowledge in the subject field.

Figure 1:
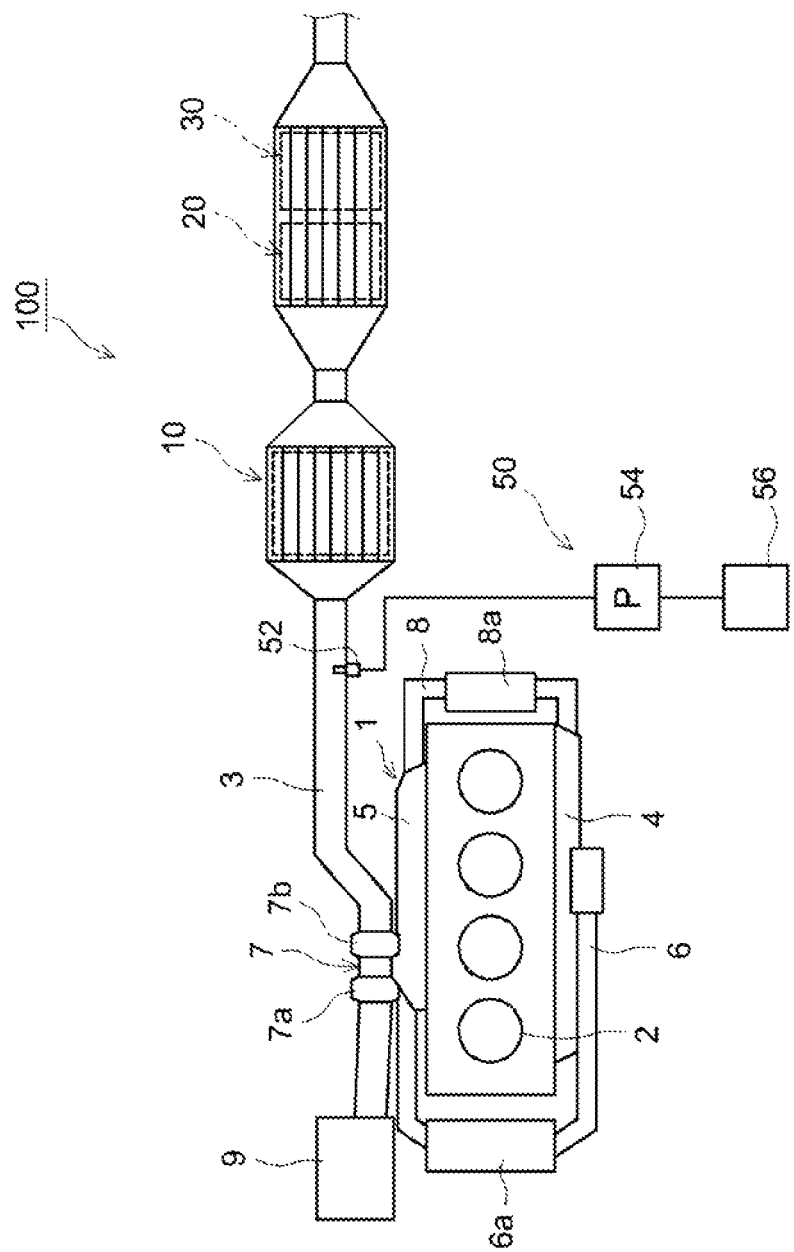
FIG. 1 illustrates schematically an exhaust gas purification apparatus according to an embodiment.

As depicted in FIG. 1, the exhaust gas purification apparatus 100 according to the present embodiment is used in a diesel engine 1 as an internal combustion engine. The configuration of the diesel engine 1 will be initially explained in a simple manner. The diesel engine 1 explained hereinbelow is merely an example of the internal combustion engine according to the present invention. The exhaust gas purification apparatus in accordance with the present invention can be also used in an internal combustion engine (for example, a gasoline engine) other than the diesel engine 1 explained hereinbelow.

The diesel engine 1 typically includes a plurality of combustion chambers 2 and fuel injection valves (not depicted in the figure) for injecting a fuel into the combustion chambers 2. Each combustion chamber 2 communicates with an intake manifold 4 and an exhaust manifold 5. The intake manifold 4 is connected through an intake duct 6 to the outlet of a compressor 7a of an exhaust turbocharger 7. The inlet of the compressor 7a is connected to an air cleaner 9. A cooling device (intercooler) 6a for cooling the air flowing inside the intake duct 6 is disposed around the intake duct 6. The exhaust manifold 5 is connected to the inlet of an exhaust turbine 7b of the exhaust turbocharger 7. The outlet of the exhaust turbine 7b is connected to an exhaust passage (exhaust pipe) 3 through which the exhaust gas flows. The exhaust manifold 5 and the intake manifold 4 are connected to each other through an exhaust gas recirculation passage (EGR passage) 8. An EGR cooling device 8a for cooling the EGR gas flowing inside the EGR passage 8 is disposed around the EGR passage 8.

<Exhaust Gas Purification Apparatus>

An exhaust gas purification apparatus 100 disclosed herein is provided in the exhaust passage (exhaust pipe) 3 of the internal combustion engine 1. The exhaust gas purification apparatus 100 includes reducing agent solution supplier 50, an upstream filter catalyst section 10, an upstream honeycomb catalyst section 20, and a downstream honeycomb catalyst section 30, in the order of description from the upstream side (left side in FIG. 1) to the downstream side (right side in FIG. 1), and purifies nitrogen oxides (NOx) contained in the discharged exhaust gas. The exhaust gas discharged from the combustion chambers is guided from the exhaust manifold 5 through the exhaust pipe 3 to the upstream filter catalyst section 10 and then to the upstream honeycomb catalyst section 20 and the downstream honeycomb catalyst section 30.

<Reducing Agent Solution Supplier>

The reducing agent solution supplier 50 is disposed on the upstream side of the exhaust pipe 3 with respect to the filter catalyst section 10. The reducing agent solution supplier 50 supplies a reducing agent solution (in this case, urea water) for generating ammonia from the upstream of the filter catalyst section 10 in the exhaust gas flow-through direction. In the present embodiment, the reducing agent solution supplier 50 includes a spraying nozzle 52, a pump 54, and a tank 56. The spraying nozzle 52 is connected through the pump 54 to the tank 56. The pump 54 supplies the urea water obtained in the tank 56 to the spraying nozzle 52. The urea water supplied to the spraying nozzle 52 is sprayed inside the exhaust pipe 3, flows downstream together with the exhaust gas flowing from the upstream side inside the exhaust pipe 3, and generates ammonia upon hydrolysis. The ammonia is adsorbed by the below-described SCR catalysts of the filter 10, the first honeycomb catalyst 20, and the second honeycomb catalyst 30, and the NOx contained in the exhaust gas are purified by the reducing action of the adsorbed ammonia. The number of the reducing agent solution supplier is not limited to one, and two or more such means may be used. For example, additional reducing agent solution supplier may be disposed between the filter catalyst section 10 and the upstream honeycomb catalyst section 20.

<Upstream Filter Catalyst Section>

The upstream filter catalyst section 10 is disposed on the downstream side of the exhaust pipe 3 with respect to the reducing agent solution supplier 50. The upstream filter catalyst section 10 is a porous filter capable of trapping the particulate matter (PM) contained in the exhaust gas, and a large number of fine pores impermeable to the PM are provided in the porous filter. The filter catalyst section 10 is configured to purity the nitrogen oxides (NOx) contained in the exhaust gas as a result of supporting a selective catalytic reduction (SCR) catalyst.

Figure 2:
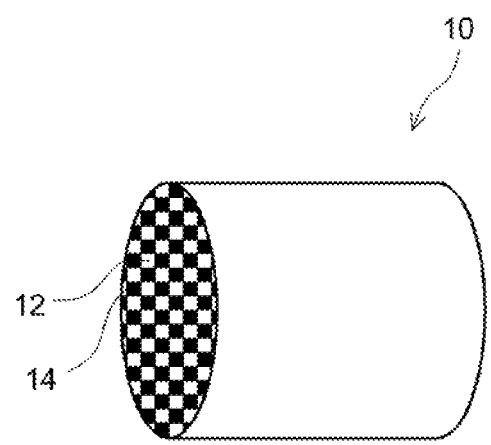
FIG. 2 is a perspective view illustrating schematically a filter catalyst section according to an embodiment.
Figure 3:
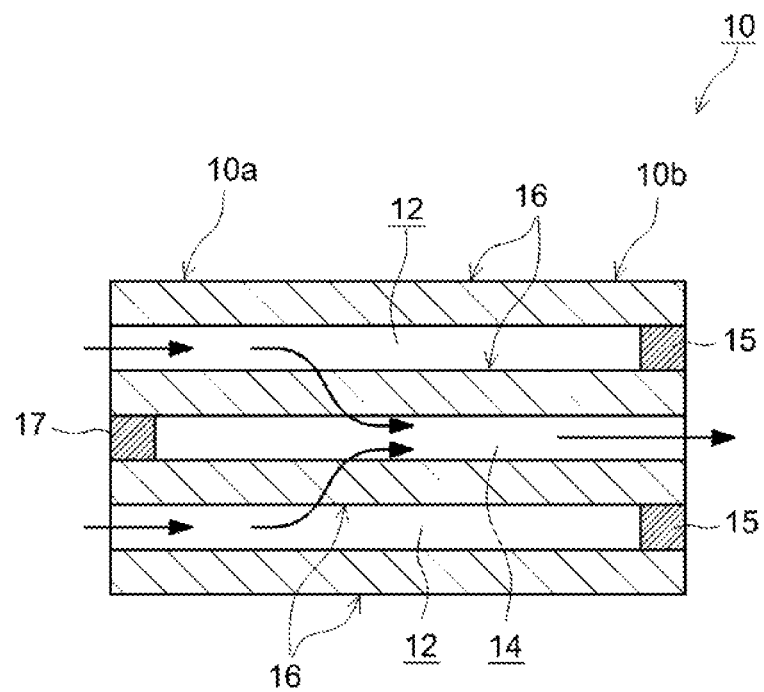
FIG. 3 is a cross-sectional view illustrating schematically as filter catalyst section according to an embodiment.

FIG. 2 is a perspective view of the filter catalyst section 10. FIG. 3 is a schematic diagram illustrating an enlarged portion of the cross section obtained by cutting the upstream filter catalyst section 10 in the axial direction. As depicted in FIG. 3, the filter catalyst section 10 is provided with a substrate of a wall flow structure and a catalyst layer.

The substrate of the upstream filter catalyst section 10 has inlet cells 12 opened only at the end on the exhaust gas inflow side, outlet cells 14 which are adjacent to the inlet cells 12 and open only at the end on the exhaust gas outflow side, and porous partition walls 16 partitioning the inlet cells 12 and the outlet cells 14. The substrate is configured, for example, of a ceramic such as a cordierite or a heat-resistant alloy.

Each inlet cell 12 is open only at the end on the exhaust gas outflow side, and each outlet cell 14 is adjacent to the inlet cell 12 and open only at the end on the exhaust gas outflow side. In the present embodiment, the end of the inlet cell 12 on the exhaust gas outflow side is closed with a sealing portion 15, and the end of the outlet cell 14 at the exhaust gas inflow side is closed with a sealing portion 17. The partition wall 16 is formed between the adjacent inlet cell 12 and outlet cell 14. The inlet cell 12 and the outlet cell 14 are partitioned by the partition wall 16. The partition wall 16 has a porous structure through which the exhaust gas can permeate. Further, a catalyst layer is formed on the surface and/or inside the partition wall 16. The catalyst layer of the filter catalyst section 10 includes a SCR catalyst constituted by a zeolite. The SCR catalyst constituted by a zeolite adsorbs ammonia derived from the reducing agent solution (in this case, urea water) sprayed inside the exhaust pipe 3 and reduces the NOx contained in the exhaust gas.

In the upstream filter catalyst section 10, the exhaust gas flows in from the inlet cells 12 of the substrate. The exhaust gas which has flown in from the inlet cells 12 reaches the outlet cells 14 through the porous partition wall 16. In FIG. 3, arrows show a route by which the exhaust gas which has flown in from the inlet cells 12 reaches the outlet cells 14 through the partition walls 16. In this configuration, since the partition wall 16 has a porous structure, while the exhaust gas passes through the partition wall 16, the PM is trapped inside the fine pores on the surface of the partition wall 16 or inside the partition wall 16. Further, since the catalyst layer including the SCR catalyst which has adsorbed ammonia is provided on the surface and/or inside the partition wall 16, while the exhaust gas passes through the interior or surface of the partition wall 16, the NOx contained in the exhaust gas are purified. The exhaust gas which has reached the outlet cells 14 through the partition wall 16 is discharged to the outside of the filter catalyst section 10 from the openings on the exhaust gas outflow side.

<Upstream Honeycomb Catalyst Section and Downstream Honeycomb Catalyst Section>

As depicted in FIG. 1, the upstream honeycomb catalyst section 20 is disposed on the downstream side of the exhaust pipe 3 with respect to the upstream filter catalyst section 10. The downstream honeycomb catalyst section 30 is disposed on the downstream side (in this case, on the downstream-most side) of the exhaust pipe 3 with respect to the upstream honeycomb catalyst section 20. The upstream honeycomb catalyst section 20 and the downstream honeycomb catalyst section 30 are configured by forming the catalyst layer on a substrate of a straight flow structure.

Figure 4:
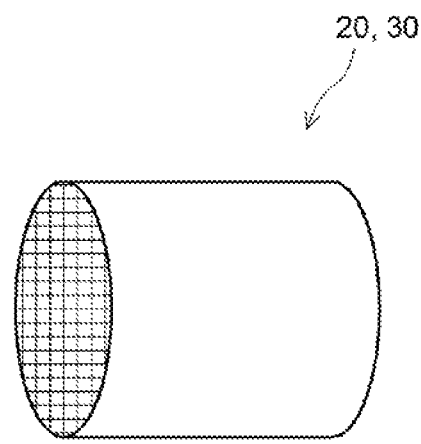
FIG. 4 is a perspective view illustrating schematically a honeycomb catalyst section according to an embodiment.

FIG. 4 is as perspective view illustrating the upstream honeycomb catalyst section 20 and the downstream honeycomb catalyst section 30. In the upstream honeycomb catalyst section 20 and the downstream honeycomb catalyst section 30 of the configuration depicted in FIG. 4, a tubular member having a honeycomb structure is used as the substrate. The substrate as a whole can have a cylindrical, elliptical-tubular, or polygonal-tubular shape. The conventional substrates for exhaust gas purification catalysts can be used as the substrate of the upstream honeycomb catalyst section 20 and the downstream honeycomb catalyst section 30. For example, it is preferred that the substrate be constituted by a heat-resistant material having a porous structure. Examples of such heat-resistant material include cordierite, silicon carbide (SiC), aluminum titanate, silicon nitride, heat resistant metals such as stainless steel, and alloys thereof.

A SCR catalyst constituted by a zeolite is included in the catalyst layers of the upstream honeycomb catalyst section 20 and the downstream honeycomb catalyst section 30. Ammonia is adsorbed on the SCR catalyst constituted by the zeolite, and the NOx contained in the exhaust gas are purified by the reducing action of the adsorbed ammonia.

By contrast with the catalyst layer of the upstream honeycomb catalyst section 20, the catalyst layer of the downstream honeycomb catalyst section 30 includes a noble metal. The catalyst layer of the downstream honeycomb catalyst section 30 includes a carrier and a noble metal supported on the carrier. Substances which have been conventionally used for the carriers of this type, such as alumina ($Al_2O_3$), zirconia ($ZrO_2$), solid solutions thereof, and composite oxides thereof, can be included as the carrier. For example, a carrier including alumina is preferred. Noble metals having a catalytic function (oxidation catalytic function) enabling the removal of excess ammonia which has not been consumed in the NOx purification are preferred as the noble metal to be supported on the carrier. For example, metal catalyst particles such as platinum (Pt), palladium (Pd), rhodium (Rh), and silver (Ag), or composite particles including such metal catalyst particles can be advantageously used. In particular, by using platinum, it is possible to remove efficiently the remnant ammonia which has not been consumed in the NOx purification.

The abovementioned exhaust gas purification apparatus 100 will be explained hereinbelow in greater detail.

The exhaust gas purification apparatus 100 disclosed herein includes the upstream filter catalyst section (upstream catalyst section) 10 disposed an the upstream side of the exhaust pipe 3, the downstream honeycomb catalyst section (downstream catalyst section) 30 disposed on the downstream side of the exhaust pipe 3 with respect to the upstream filter catalyst section 10, and the reducing agent solution supplier 50 for supplying urea water (reducing agent solution) for generating ammonia from the upstream of the upstream filter catalyst section 10. The upstream filter catalyst section 10 and the downstream honeycomb catalyst section 30 each include the SCR catalyst constituted by a zeolite which adsorbs ammonia and reduces the NOx contained in the exhaust gas.

Figure 6:
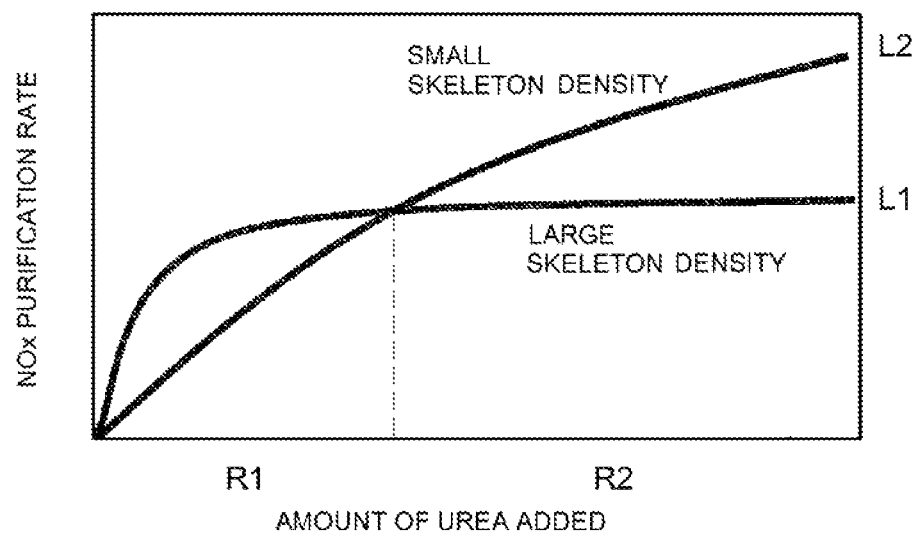
FIG. 6 is a graph illustrating the relationship between the NOx purification rate and urea addition amount.

The results of various tests performed by the inventors have demonstrated that where the catalyst sections are made to differ in the skeleton density of the SCR catalyst constituted by a zeolite, a change occurs in the relationship between the supplied amount of urea water and the NOx purification rate. More specifically, a plurality of catalysts including the SCR catalysts constituted by zeolites with different skeleton structures were prepared and the NOx purification rate of the catalysts was measured while changing the amount of added urea. Among them, FIG. 6 shows the results of NOx purification rate measured with respect to the catalysts including SCR catalyst with a relatively large skeleton density and the catalysts including SCR catalysts with a relatively small skeleton density. A line L1 in FIG. 6 shows the NOx purification rate in the case of using the SCR catalyst with a relatively large skeleton density, and a line L2 in FIG. 6 shows the NOx purification rate in the case of using the SCR catalyst with a relatively small skeleton density.

As depicted in FIG. 6, in a region R1 with a comparatively small amount of urea water added, the NOx purification rate of the zeolite with a relatively large skeleton density tends to be higher than that of the zeolite with a relatively small skeleton density. Conversely, in a region R2 with a comparatively large amount of urea water added, the NOx purification rate of the zeolite with a relatively small skeleton density tends to be higher than that of the zeolite with a relatively large skeleton density. It means that in the region R1 with a comparatively small amount of urea water added, using the zeolite with a relatively large skeleton density is more effective in terms of NOx purification, whereas in the region R2 with a comparatively large amount of urea water added, using the zeolite with a relatively small skeleton density is more effective in terms of NOx purification.

Here, according to the inventors' findings, the amount of urea water supplied to the catalyst section 10, 20 and 30 is not uniform, and the amount of supplied urea water tends to be lower in the downstream catalyst sections at a distance from the reducing agent solution supplier 50. In particular, among the plurality of catalyst sections 10, 20, and 30, the downstream honeycomb catalyst section 30 including the noble metal (for example, Pt) needs to be disposed at the very last stage of the exhaust pipe. Therefore, the amount of supplied urea water therein tends to decrease. For this reason, the amount of supplied urea water in the downstream honeycomb catalyst section 30 tends to be lower than in the upstream filter catalyst section 10. For this reason, using a zeolite with a relatively large skeleton density is effective for efficiently purifying the NOx in the downstream honeycomb catalyst section 30 with a small amount of supplied urea water. Meanwhile, using a zeolite with a relatively small skeleton density is effective for efficiently purifying the NOx in the upstream filter catalyst section 10 with a large amount of supplied urea water.

Based on such findings, the inventors used a zeolite with a relatively small skeleton density in the SCR catalyst in the upstream filter catalyst section 10, and used a zeolite with a relatively large skeleton density in the SCR catalyst in the downstream honeycomb catalyst section 30. Thus, in the exhaust gas purification apparatus 100 disclosed herein, the skeleton density A of the SCR catalyst included in the upstream filter catalyst section 10 is less than the skeleton density B of the SCR catalyst included in the downstream honeycomb catalyst section 30 (A<B). The skeleton density of the SCR catalyst constituted by a zeolite, as referred to in the present specification, is the number of $TO_4$ tetrahedrons (T=Si, Al, etc.) in a crystal which is included in a 1000 Å$^3$ volume of the zeolite.

The skeleton density A of the SCR catalyst included in the upstream filter catalyst section 10 is not particularly limited, provided it is less than the skeleton density B of the SCR catalyst included in the downstream honeycomb catalyst section 30. For example, the skeleton density A of the SCR catalyst included in the upstream filter catalyst section 10 can be 15.1 T/1000 Å$^3$ or less (for example, 14 T/1000 Å$^3$ to 15.1 T/1000 Å$^3$), preferably 14.5 T/1000 Å$^3$ or less. Further, the skeleton density B of the SCR catalyst included in the downstream honeycomb catalyst section 30 is not particularly limited, provided it is larger than the skeleton density A of the SCR catalyst included in the upstream filter catalyst section 10. For example, the skeleton density B of the SCR catalyst included in the downstream honeycomb catalyst section 30 can be 15.3 T/1000 Å$^3$ or more (for example, 15.3 T/1000 Å$^3$ to 17 T/1000 Å$^3$), preferably 16 T/1000 Å$^3$ or more. For example, the skeleton density A of the SCR catalyst included in the upstream filter catalyst section 10 and the skeleton density B of the SCR catalyst included in the downstream honeycomb catalyst section 30 preferably satisfy the relationship 0.1 T/1000 Å$^3 \leq$ B−A, more preferably the relationship 0.2 T/1000 Å$^3 \leq$ B−A $\leq$ 3 T/1000 Å$^3$. Where the difference between the skeleton densities (B−A) is within those ranges, the reaction efficiency of the upstream filter catalyst section 10 and the downstream honeycomb catalyst section 30 is greatly increased. As a result, it is possible to realize a high NOx purification performance unattainable with the conventional configuration.

Here, it is also desirable that the skeleton density A of the SCR catalyst included in the upstream filter catalyst section 10 and the skeleton density B of the SCR catalyst included in the downstream honeycomb catalyst section 30 be each about 14 T/1000 Å$^3$ (inclusive) to 17 T/1000 Å$^3$ (inclusive). Where the skeleton densities A and B of the SCR catalysts are too large, the reactivity of the SCR catalysts decreases. As a result, the NOx purification rate tends to decrease. Meanwhile, where the skeleton densities A and B of the SCR catalysts are too small, the heat resistance of the SCR catalysts decreases. As a result, the NOx purification performance after high-temperature durability period can decrease. Therefore, from the standpoint of ensuring excellent reactivity in combination with high heat resistance, it is preferred that the skeleton density A of the SCR catalyst included in the upstream filter catalyst section 10 and the skeleton density B of the SCR catalyst included in the downstream honeycomb catalyst section 30 be each about 14 T/1000 Å$^3$ (inclusive) to 17 T/1000 Å$^3$ (inclusive), more preferably about 15 T/1000 Å$^3$ (inclusive) to 16 T/1000 Å$^3$ (inclusive).

With the technique disclosed herein, the average fine pore size of the SCR catalyst constituted by the zeolite included in the upstream catalyst section 10 and the average fine pore size of the SCR catalyst constituted by the zeolite included in the downstream honeycomb catalyst section 30 are each 2 Å (inclusive) to 7 Å (inclusive). The average fine pore size of the zeolite is assumed to be measured on the basis of a gas adsorption method (typically, nitrogen adsorption method). Where the average fine pore size of the zeolite is within the abovementioned range, overall high NOx purification performance can be demonstrated and such purification performance can be effectively maintained.

The preferred examples of the SCR catalyst included in the upstream filter catalyst section 10 include a catalyst with the skeleton density A of 14 T/1000 Å$^3$ (inclusive) to 17 T/1000 Å$^3$ (inclusive) and the average fine pore size within the range of 2 Å (inclusive) to 7 Å (inclusive), a catalyst with the skeleton density A of 14 T/1000 Å$^3$ (inclusive) to 16 T/1000 Å$^3$ (inclusive) and the average fine pore size within the range of 2 Å (inclusive) to 6 Å (inclusive), and a catalyst with the skeleton density A of 14 T/1000 Å$^3$ (inclusive) to 15.1 T/1000 Å$^3$ (inclusive) and the average fine pore size within the range of 3 Å (inclusive) to 5 Å (inclusive). Where such a combination of the skeleton density A of the SCR catalyst and the average fine pore size is obtained, the reactivity and heat resistance of the SCR catalyst included in the upstream filter catalyst section 10 are effectively improved and the NOx purification performance and durability of the upstream filter catalyst section 10 are further improved.

The preferred examples of the SCR catalyst included in the downstream honeycomb catalyst section 30 include a catalyst with the skeleton density A of 14 T/1000 Å$^3$ (inclusive) to 17 T/1000 Å$^3$ (inclusive) and the average fine pore size within the range of 2 Å (inclusive) to 7 Å (inclusive), a catalyst with the skeleton density A of 15 T/1000 Å$^3$ (inclusive) to 17 T/1000 Å$^3$ (inclusive) and the average fine pore size within the range of 3 Å (inclusive) to 7 Å (inclusive), and a catalyst with the skeleton density A of 15.3 T/1000 Å$^3$ (inclusive) to 17 T/1000 Å$^3$ (inclusive) and the average fine pore size within the range of 4 Å (inclusive) to 6 Å (inclusive). Where such a combination of the skeleton density B of the SCR catalyst and the average fine pore size is obtained, the reactivity and heat resistance of the SCR catalyst included in the downstream honeycomb catalyst section 30 are effectively improved and the NOx purification performance and durability of the downstream honeycomb catalyst section 30 are further unproved.

Specific examples of the SCR catalysts to be included in the upstream filter catalyst section 10 and the downstream honeycomb catalyst section 30 are zeolites including at least Si as an element constituting the base skeleton. Zeolites with substituted cations such as Al and P in the skeleton may be also used. For example, β-type zeolites and silicon aluminophosphate (SAPO) zeolites can be used. Examples of the preferred zeolite structure, as represented by the codes defined by the International Zeolite Association (IZA), include AEI, AFT, AFX, AST, BEA, BEC, CHA, EAB, ETR, GME, ITE, KFI, LEV, THO, PAU, and UFI. Those zeolites may be used individually or in combinations of two or more thereof.

Ion-exchange zeolites in which transition metals such as Fe, Cu, and V have been ion exchanged may be also used. For example, Cu-ion-exchanged SAPO zeolites and Fe-ion-exchanged β-type zeolites can be advantageously used. In such ion-exchange zeolites, the skeleton density A is 14 T/1000 Å$^3$ (inclusive) to 17 T/1000 Å$^3$ (inclusive) and the average fine pore size is within the range of 2 Å (inclusive) to 7 Å (inclusive). Therefore, by using the SCR catalysts constituted by such zeolites in the upstream filter catalyst section 10 and the downstream honeycomb catalyst section 30, it is possible to improve further the NOx purification performance and durability (thermal durability) of the upstream filter catalyst section 10 and the downstream honeycomb catalyst section 30. For example, the Cu-ion-exchanged SAPO zeolites have the zeolite skeleton density of about 15.1 T/1000 Å$^3$, and the Fe-ion-exchanged β-type zeolites have the zeolite skeleton density of about 15.3 T/1000 Å$^3$. Further, the average fine pore size is about 3.7 Å in the Cu-ion-exchanged SAPO zeolites and about 5.9 Å in the Fe-ion-exchanged β-type zeolites.

The skeleton density of the SCR catalyst constituted by the zeolite included in the upstream honeycomb catalyst section 20 disposed between the upstream filter catalyst section 10 and the downstream honeycomb catalyst section 30 is not particularly limited, but is preferably less than the skeleton density of the SCR catalyst constituted by the zeolite included in the downstream honeycomb catalyst section 30, and is about the same as the skeleton density of the SCR catalyst constituted by the zeolite included in the upstream filter catalyst section 10. For example, the SCR catalyst constituted by the zeolite included in the upstream honeycomb catalyst section 20 may be substantially the same as the SCR catalyst constituted by the zeolite included in the upstream filter catalyst section 10. In such a case, the reactivity and heat resistance of the SCR catalyst constituted by the zeolite included in the upstream honeycomb catalyst section 20 are effectively improved, and the NOx purification performance and durability of the upstream honeycomb catalyst section 20 are further improved.

The exhaust gas purification apparatus 100 according to an embodiment of the present invention will be explained hereinbelow, but the present invention is not limited to this embodiment.

For example, in the embodiment, an example is considered in which two honeycomb catalyst sections, namely, the upstream honeycomb catalyst section 20 and the downstream honeycomb catalyst section 30, are used, but this number of the honeycomb catalyst sections is not limiting. For example, three or more honeycomb catalyst sections may be provided. In this case the skeleton density of the SCR catalyst included at least in the honeycomb catalyst section disposed on the downstreammost side (very last stage) of the exhaust pipe, among the plurality (three or more) of the honeycomb catalyst sections, may be larger than the skeleton density of the SCR catalyst included in the upstream filter catalyst section 10. Where the SCR catalysts that differ in skeleton density are thus optimally arranged on the upstream side and downstream side, the reaction efficiency of each catalyst section can be greatly improved. A noble metal such as Pt may be supported at least on the honeycomb catalyst section disposed on the downstreammost side (very last stage) of the exhaust pipe. Where the noble metal is supported on the honeycomb catalyst section disposed on the downstreammost side of the exhaust pipe, the discharge (slip) of ammonia to the outside can be adequately suppressed.

Test examples relating to the present invention are described hereinbelow, but the present invention is not intended to be limited to the features disclosed in the test examples hereinbelow.

Example 1

(1) Upstream Filter Catalyst

SAPO34 formed from silica, alumina, and phosphorus was dispersed in ion-exchange water. Copper acetate was then added, followed by stirring for 12 h at 80° C., filtering, and washing. Drying was then performed for 5 h at 200° C. to prepare a Cu-ion-exchanged zeolite (Cu support amount 3% by mass). A total of 1000 g of the Cu-ion-exchanged zeolite, 500 g of silica sol, and 1000 g of pure water were mixed and then stirred for 1 h in a ball mill to obtain a Cu-ion-exchanged SAPO34 slurry. The obtained Cu-ion-exchanged SAPO34 slurry was applied to a ceramic substrate (diameter 160 mm×length 100 mm) of a wall flow type and excess slurry was removed, followed by drying at 100° C. and heat treatment at 500° C. The upstream filter catalyst (the upstream filter catalyst section 10 (see FIG. 1)) was thus produced. The coated amount of the Cu-ion-exchanged SAPO34 slurry in the obtained catalyst was 100 g per 1 L of the substrate.

(2) Upstream Honeycomb Catalyst

SAPO34 formed from silica, alumina, and phosphorus was dispersed in ion-exchange water. Copper acetate was then added, followed by stirring for 12 h at 80° C., filtration, and washing. Drying was then performed for 5 h at 200° C. to prepare a Cu-ion-exchanged zeolite (Cu support amount 3% by mass). A total of 1000 g of the Cu-ion-exchanged zeolite, 500 g of silica sol, and 1000 g of pure water were mixed and then stirred for 1 h in a ball mill to obtain a Cu-ion-exchanged SAPO34 slurry. The obtained Cu-ion-exchanged SAPO34 slurry was applied to a ceramic substrate (diameter 160 mm×length 100 mm) of as straight flow type and excess slurry was removed, followed by drying at 100° C. and heat treatment at 500° C. The upstream honeycomb catalyst (the upstream honeycomb catalyst section 20 (see FIG. 1)) was thus produced. The coated amount of the Cu-ion-exchanged SAPO34 slurry in the obtained upstream honeycomb catalyst was 160 g per L of the substrate.

(3) Downstream Honeycomb Catalyst

A β-type zeolite with a silica-alumina ratio of 25 was dispersed in ion-exchange water. Iron acetate was then added, followed by stirring for 12 h at 80° C., filtering, and washing. Drying was then performed for 5 h at 200° C. to prepare a Fe-ion-exchanged zeolite (Fe support amount 2% by mass). A total of 1000 g of the Fe-ion-exchanged zeolite, 500 g of silica sol, and 1000 g of pure water were mixed and then stirred for 1 h in a ball mill to obtain a Fe-ion-exchanged β-type zeolite slurry. The obtained Fe-ion-exchanged β-type zeolite slurry was applied to a ceramic substrate (diameter 160 mm×length 100 mm) of a straight flow type and excess slurry was removed, followed by drying at 100° C. and heat treatment at 500° C. The honeycomb catalyst coated with Fe-ion-exchanged β-type zeolite was thus obtained.

Further, γ-alumina with a specific surface area of 120 $m^2/g$ was dispersed in pure water, and dinitrodiamine platinum was then added. A Pt-supporting alumina (Pt support amount: 1% by mass; referred to hereinbelow as Pt/alumina) was then obtained by drying for 6 h or more at 100° C. and heat treating for 1 h at 500° C. A total of 1000 g of the Pt/alumina 200 g of alumina sol, and 1000 g of pure water were mixed and then stirred for 1 h in a ball mill to obtain a Pt/alumina slurry. The downstream honeycomb catalyst (the downstream honeycomb catalyst section 30 (see FIG. 1) was then obtained by applying the Pt/alumina slurry to a portion corresponding to ⅕ of the total length of the substrate from the end portion of the honeycomb catalyst (substrate) coated with the Fe-ion-exchanged β-type zeolite, on the exhaust gas outflow side, toward the downstream side, removing the excess slurry, drying at 100° C. and heat treating at 500° C. The coated amount of the Fe-ion-exchanged β-type zeolite in the obtained catalyst was 160 g per 1 L of the substrate. The coated amount of the Pt/alumina per 1 honeycomb catalyst was 20 g, and the Pt support amount was 0.2 g per 1 honeycomb catalyst.

An exhaust gas purification apparatus according to Example 1 was fabricated by arranging the obtained upstream filter catalyst, upstream honeycomb catalyst, and downstream honeycomb catalyst in the exhaust pipe of a 2.0 L direct-injection diesel engine in the order of description from the upstream side. In the exhaust gas purification apparatus, the skeleton density of the SCR catalyst (Cu-ion-exchanged SAPO34: skeleton density 15.1 T/1000 $Å^3$, average fine pore size 3.7 Å) included in the upstream honeycomb catalyst and downstream honeycomb catalyst is less than the skeleton density of the SCR catalyst (Fe-ion-exchanged β-type zeolite: skeleton density 15.3 T/1000 $Å^3$, average fine pore size 5.9 Å) included in the downstream honeycomb catalyst.

Example 2

An exhaust gas purification apparatus was fabricated in the same manner as in Example 1, except that the SCR catalyst used in the downstream honeycomb catalyst was changed to a Cu-ion-exchanged β-type zeolite. More specifically, a β-type zeolite with a silica-alumina ratio of 25 was dispersed in ion-exchange water. Copper acetate was then added, followed by stirring for 12 h at 80° C., filtering, and washing. Drying was then performed for 5 h at 200° C. to prepare a Cu-ion-exchanged β-type zeolite (Cu support amount 2% by mass). The downstream honeycomb catalyst was than fabricated by the procedure of Example 1 by using the Cu-ion-exchanged β-type zeolite.

Comparative Example 1

An exhaust gas purification apparatus was fabricated in the same manner as in Example 1, except that the SCR catalysts used in the upstream filter catalyst, upstream honeycomb catalyst, and downstream honeycomb catalyst were all changed to Cu-ion-exchanged SAPO34 (skeleton density 15.1 T/1000 $Å^3$, average fine pore size 3.7 Å).

Comparative Example 2

An exhaust gas purification apparatus was fabricated in the same manner as in Example 1, except that the SCR catalysts used in the upstream filter catalyst, upstream honeycomb catalyst, and downstream honeycomb catalyst were all changed to a Fe-ion-exchanged β-type zeolite with a silica-alumina ratio of 25 (skeleton density 15.3 T/1000 $Å^3$, average fine pore size 5.9 Å).

Comparative Example 3

An exhaust gas purification apparatus was fabricated in the same manner as in Example 1, except that the SCR catalysts used in the upstream filter catalyst, upstream honeycomb catalyst, and downstream honeycomb catalyst were all changed to a Cu-ion-exchanged Y-type zeolite with a silica-alumina ratio of 25 (skeleton density 13.3 T/1000 $Å^3$, average fine pore size 7.4 Å).

Comparative Example 4

An exhaust gas purification apparatus was fabricated in the same manner as in Example 1, except that the SCR catalysts used in the upstream filter catalyst, upstream honeycomb catalyst, and downstream honeycomb catalyst were all changed to a Cu-ion-exchanged ZSM5-type zeolite with a silica-alumina ratio of 25 (skeleton density 18.4 T/1000 $Å^3$, average fine pore size 4.6 Å).

A durability test was performed with respect to the exhaust purification apparatus of each example. The durability test was performed by implementing aging treatment for 20 h at 700° C. under a 10% vapor-containing atmosphere. The NOx purification rate was evaluated before and after the durability test (initial rate and rate after 700° C. durability test). More specifically, the upstream filter catalyst, upstream honeycomb catalyst, and downstream honeycomb catalyst of the examples were mounted on the exhaust pipe of the 2.0 L direct-injection diesel engine in the above-described manner, exhaust gas was allowed to flow therethrough, and the NOx purification rate was measured. An injector was disposed on the upstream side of the exhaust pipe with respect to the upstream filter catalyst, and urea water was added from the injector as a reducing agent solution for generating ammonia. The urea water was adjusted to obtain an equivalent ratio of $NH_3$ to NOx of 1. In this case, the NOx purification rate (%) was calculated by the following formula: {[(NOx concentration (ppm) in catalyst entry gas)–(NOx concentration (ppm) in catalyst exit gas)]/(NOx concentration (ppm) in catalyst entry gas)}×100. The results are shown in FIG. 5 and Table 1.

TABLE 1

|  | Initial NOx purification rate (%) | NOx purification rate after 700° C. durability test (%) |
| --- | --- | --- |
| Example 1 | 98 | 97 |
| Example 2 | 98 | 98 |
| Comparative Example 1 | 90 | 87 |
| Comparative Example 2 | 85 | 83 |
| Comparative Example 3 | 90 | 30 |
| Comparative Example 4 | 67 | 67 |

Figure 5:
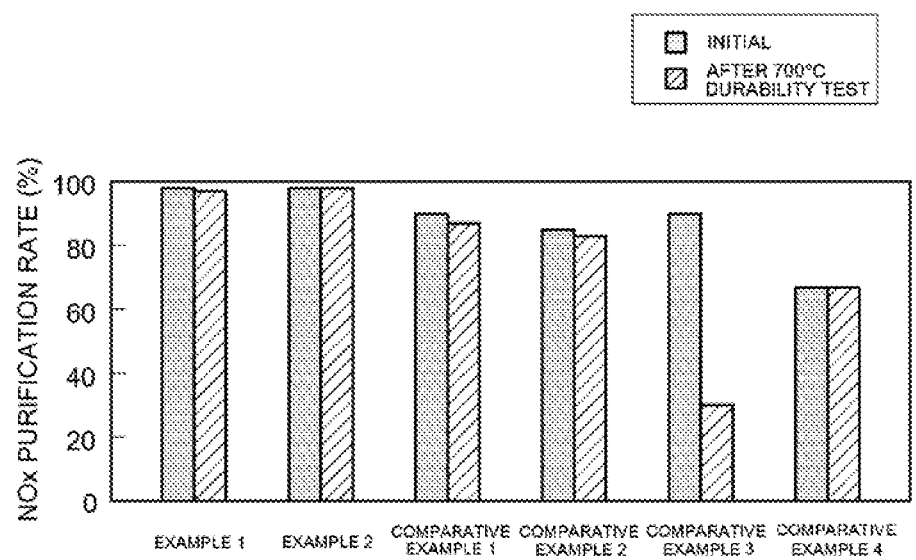
FIG. 5 is a graph in which NOx purification rates of various examples are compared.

As shown in FIG. 5 and Table 1, the exhaust gas purification apparatus according to Comparative Example 3 in which the SCR catalysts included in the upstream filter catalyst, upstream honeycomb catalyst, and downstream honeycomb catalyst were all changed to a Cu-ion-exchanged Y-type zeolite (skeleton density 13.3 T/1000 $Å^3$) had a high initial NOx purification rate, but the NOx purification rate greatly decreased after the 700° C. durability test. Meanwhile, the exhaust gas purification apparatus according to Comparative Example 4 in which the SCR catalysts included in the upstream filter catalyst, upstream honeycomb catalyst, and downstream honeycomb catalyst were all changed to a Cu-ion-exchanged ZSM5-type zeolite (skeleton density 18.4 T/1000 $Å^3$) could maintain the NOx purification rate after the 700° C. durability test, but the initial NOx purification rate thereof tended to be lower than that in other examples. By contrast, the exhaust gas purification apparatus according to Comparative Example 1 in which the SCR catalysts included in the upstream filter catalyst, upstream honeycomb catalyst, and downstream honeycomb catalyst were all changed to Cu-ion-exchanged SAPO34 (skeleton density 15.1 T/1000 $Å^3$) and the exhaust gas purification apparatus according to Comparative Example 2 in which the SCR catalysts included in the upstream filter catalyst, upstream honeycomb catalyst, and downstream honeycomb catalyst were all changed to a Fe-ion-exchanged β-type zeolite (skeleton density 15.3 T/1000 $Å^3$) had the initial NOx purification rate higher than that of Comparative Example 4 and also had the NOx purification rate after the 700° C. durability test greatly improved over that in Comparative Example 3.

Further, in the exhaust gas purification apparatus according to Example 1 in which the skeleton density of the SCR catalysts included in the upstream honeycomb catalyst and downstream honeycomb catalyst (Cu-ion-exchanged SAPO34: skeleton density 15.1 T/1000 $Å^3$) was lower than the skeleton density of the SCR catalyst included in the downstream honeycomb catalyst (Fe-ion-exchanged β-type zeolite: skeleton density 15.3 T/1000 $Å^3$), the initial NOx purification rate was higher and the NOx purification rate after the 700° C. durability test was also further improved over those of Comparative Examples 1 and 2. Likewise, in the exhaust gas purification apparatus according to Example 2 in which the skeleton density of the SCR catalysts included in the upstream honeycomb catalyst and downstream honeycomb catalyst (Cu-ion-exchanged SAPO34: skeleton density 15.1 T/1000 $Å^3$) was lower than the skeleton density of the SCR catalyst included in the downstream honeycomb catalyst (Cu-ion-exchanged β-type zeolite: skeleton density 15.3 T/1000 $Å^3$), the initial NOx purification rate was higher and the NOx purification rate after the 700° C. durability test was also further improved over those of Comparative Examples 1 and 2. The above-described results have confirmed that where the skeleton density of the SCR catalysts included in the upstream honeycomb catalyst and downstream honeycomb catalyst is made lower than the skeleton density of the SCR catalyst included in the downstream honeycomb catalyst, the NOx purification performance and durability can be improved. Further, the comparison of Example 1 and Comparative Examples 1 and 2 with Comparative Examples 3 and 4 indicates that the skeleton density of the SCR catalysts included in the upstream honeycomb catalyst and downstream honeycomb catalyst is preferably about 14(T/1000 $Å^3$) (inclusive) to 17(T/1000 $Å^3$) (inclusive), more preferably about 15(T/1000 $Å^3$) (inclusive) to 16(T/1000 $Å^3$) (inclusive).

Various variation examples of the exhaust gas purification apparatus 100 are described hereinabove, but the structure of the exhaust gas purification apparatus 100 is not limited to the above-described embodiments.

The exhaust gas purification apparatus 100 is particularly advantageous as an apparatus, for purifying hazardous component in an exhaust gas with a comparatively low temperature, such as that of a diesel engine. However, the application of the exhaust gas purification apparatus 100 in accordance with the present invention is not limited to the purification of hazardous components in the exhaust gas of diesel engines, and the apparatus can be used for a variety of applications for purifying hazardous components in exhaust gas discharged by other engines (for example, gasoline engine).

INDUSTRIAL APPLICABILITY

The present invention can provide an exhaust gas purification apparatus having high NOx purification performance.

The invention claimed is:
1. An exhaust gas purification apparatus disposed in an exhaust passage of an internal combustion engine to purify an exhaust gas discharged from the internal combustion engine, the apparatus comprising:
   an upstream catalyst section which is disposed on an upstream side of the exhaust passage;
   a downstream catalyst section which is disposed on a downstream side of the exhaust passage with respect to the upstream catalyst section; and
   reducing agent solution supplier that supplies a reducing agent solution for generating ammonia from an upstream of the upstream catalyst section,
   wherein
   the upstream catalyst section and the downstream catalyst section each include a SCR catalyst constituted by a zeolite, the SCR catalyst adsorbing ammonia and reducing $NO_x$ in the exhaust gas, a skeleton density of each of the SCR catalysts constituted by a zeolite is a number of $TO_4$ tetrahedrons in a crystal that is included in a 1000 $Å^3$ volume of the zeolite, T is an element other than oxygen which constitutes the $TO_4$ tetrahedrons, and a skeleton density (A) of the SCR catalyst included in the upstream catalyst section is less than a skeleton density (B) of the SCR catalyst included in the downstream catalyst section (A<B).

2. The exhaust gas purification apparatus according to claim 1, wherein a difference between the skeleton density (A) of the SCR catalyst constituted by the zeolite included in the upstream catalyst section and the skeleton density (B) of the SCR catalyst constituted by the zeolite included in the downstream catalyst section is $0.1(T/1000 \text{ Å}^3) \leq B-A$.

3. The exhaust gas purification apparatus according to claim 1, wherein the skeleton density (A) of the SCR catalyst constituted by the zeolite included in the upstream catalyst section and the skeleton density (B) of the SCR catalyst constituted by the zeolite included in the downstream catalyst section are each $14(T/1000 \text{ Å}^3)$ (inclusive) to $17(T/1000 \text{ Å}^3)$ (inclusive).

4. The exhaust gas purification apparatus according to claim 1, wherein an average fine pore size of the SCR catalyst constituted by the zeolite included in the upstream catalyst section and an average fine pore size of the SCR catalyst constituted by the zeolite included in the downstream catalyst section are each 2 Å (inclusive) to 7 Å (inclusive).

5. The exhaust gas purification apparatus according to claim 1, further comprising:

a filter catalyst section disposed on the upstream side of the exhaust pipe; and a plurality of honeycomb catalyst sections disposed on the downstream side of the exhaust pipe with respect to the filter catalyst section, wherein the upstream catalyst section is provided as the filter catalyst section; and the downstream catalyst section is provided as the honeycomb catalyst section disposed on a downstream most side of the exhaust pipe, among the plurality of the honeycomb catalyst sections.

6. The exhaust gas purification apparatus according to claim 5, wherein a noble metal is supported in the honeycomb support section disposed on the downstream most side.

7. The exhaust gas purification apparatus according to claim 1, wherein the zeolite included in the upstream catalyst section is a Cu-ion-exchanged silicon aluminophosphate zeolite.

* * * * *